United States Patent
Wojciechowski (10) Patent No.: US 6,726,149 B2
(45) Date of Patent: Apr. 27, 2004

(54) DERIVATIVE AIRCRAFT AND METHODS FOR THEIR MANUFACTURE

(75) Inventor: Paul M. Wojciechowski, Bothell, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/160,363

(22) Filed: May 31, 2002

(65) Prior Publication Data

US 2003/0222170 A1 Dec. 4, 2003

(51) Int. Cl.[7] .................................................. B64C 1/00
(52) U.S. Cl. ........................................ 244/123; 244/119
(58) Field of Search ............................. 244/119, 100 R, 244/102 R, 120, 54, 123, 129

(56) References Cited

U.S. PATENT DOCUMENTS

| | | | | |
|---|---|---|---|---|
| 1,354,677 | A | * | 10/1920 | Mix |
| 2,370,801 | A | * | 3/1945 | Klose |
| 2,749,061 | A | * | 6/1956 | Franz |
| 2,750,134 | A | * | 6/1956 | Hawkins et al. |
| 3,018,985 | A | * | 1/1962 | Voigt |
| 4,915,324 | A | * | 4/1990 | Foreau et al. |
| 5,039,032 | A | | 8/1991 | Rudolph |
| 5,275,358 | A | | 1/1994 | Goldhammer et al. |
| 5,435,504 | A | * | 7/1995 | Inoue et al. |
| 5,692,703 | A | * | 12/1997 | Murphy et al. |
| 5,897,078 | A | * | 4/1999 | Burnham et al. |
| 5,909,858 | A | | 6/1999 | Hawley |

FOREIGN PATENT DOCUMENTS

DE 634884 * 7/1934 ................. 244/123

* cited by examiner

*Primary Examiner*—Tien Dinh
(74) *Attorney, Agent, or Firm*—Perkins Coie LLP (57) ABSTRACT

Derivative aircraft and methods for their manufacture. In one embodiment, a derivative aircraft having a derivative wing is derived from a baseline aircraft having a baseline wing. In one aspect of this embodiment, the baseline wing can include an outboard wing portion and an inboard wing portion, the inboard wing portion having a forward inboard wing portion and an aft inboard wing portion. In a further aspect of this embodiment, the derivative wing can include a wing insert having a spanwise wing insert portion and a chordwise wing insert portion, the chordwise wing insert portion of the wing insert being interposed between the forward inboard wing portion and the aft inboard wing portion of the baseline wing, and the spanwise wing insert portion being interposed between the outboard wing portion and the forward and aft inboard wing portions of the baseline wing.

35 Claims, 7 Drawing Sheets

DERIVATIVE AIRCRAFT AND METHODS FOR THEIR MANUFACTURE

TECHNICAL FIELD

The following disclosure relates generally to derivative aircraft and, more particularly, to derivative aircraft wing configurations for high-speed aircraft and methods for designing and manufacturing such configurations.

BACKGROUND

Mission requirements typically dictate the configurations of aircraft. For example, aircraft with long-range mission requirements are typically configured to carry large quantities of fuel to increase their range between fuel stops. In addition, such aircraft are typically configured with relatively large wings to enable them to take off and land on conventional airport runways with heavy fuel loads. In contrast, aircraft with short-range mission requirements do not need to carry large quantities of fuel. Consequently, they typically require less wing area and have lower operating empty weights than long-range aircraft having comparable passenger capacities. As a result, using a long-range aircraft for a short flight can be very inefficient because the unnecessarily high empty weight of the long-range aircraft can result in poor fuel economy.

Accordingly, it would be advantageous for an aircraft manufacturer to be able to offer a wide range of aircraft configurations, with each configuration being tailored to a particular mission. In this way, customers desiring long-range aircraft could order models having relatively large fuel capacities and large wings, and customers desiring short-range aircraft could order models having relatively small fuel capacities and small wings. In practice, however, the cost associated with designing, manufacturing, and certifying a new aircraft is substantial. As a result, many aircraft manufacturers offer only a limited range of models that, not surprisingly, represent a compromise of disparate mission requirements.

One way that aircraft manufacturers try to minimize the high cost associated with developing new aircraft is to develop "derivative" aircraft. Derivative aircraft are "new" aircraft designs derived from existing aircraft designs. By utilizing many of the components and features from the existing aircraft designs, derivative aircraft can greatly reduce the cost of designing, manufacturing, and certifying a new aircraft configuration.

Figure 1A:
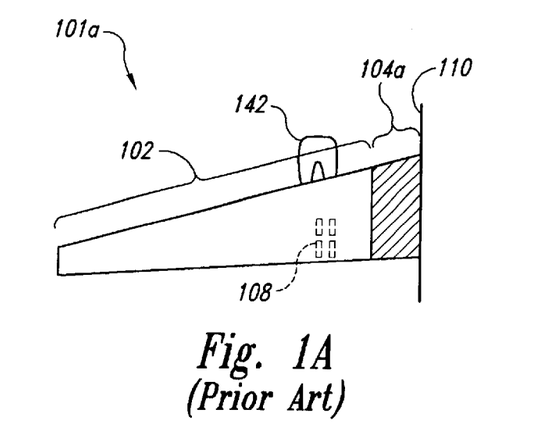
FIGS. 1A–C are top views of three derivative aircraft wings in accordance with the prior art.
Figure 1B:
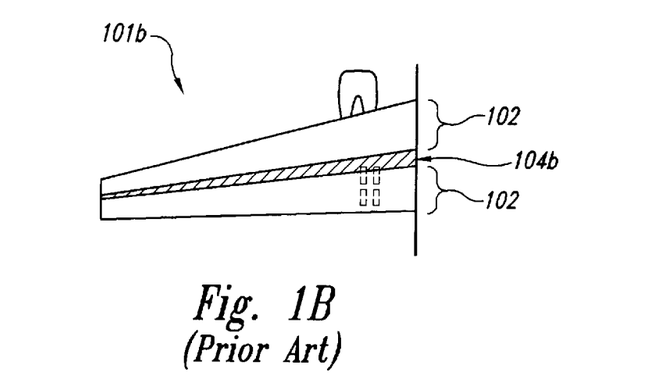
Figure 1C:
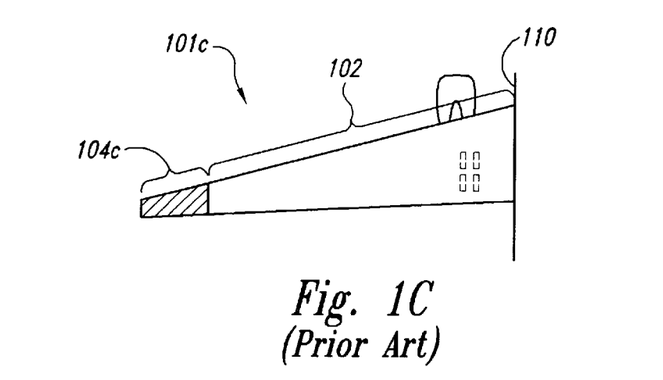

FIGS. 1A–C are top views of three derivative aircraft wings 101a–c, respectively, in accordance with the prior art. Each of the derivative aircraft wings 101a–c provides more wing area than an existing wing 102 from which it was derived. For example, the derivative aircraft wing 101a shown in FIG. 1A includes the existing wing 102 and a wing-root insert 104a extending between the existing wing 102 and a fuselage 110. The existing wing 102 includes an engine pod 142 and landing gear assembly 108 that are, accordingly, moved away from the fuselage 110 by the wing insert 104a. The derivative aircraft wing 101b shown in FIG. 1B includes a chordwise wing insert 104b extending between forward and aft portions of the existing wing 102. The derivative aircraft wing 101c shown in FIG. 1C includes a wing-tip extension 104c extending outward from the existing wing 102.

Each of the derivative aircraft wings 101a–c has shortcomings. For example, the wing-root insert 104a shown in FIG. 1A shifts the landing gear assembly 108, the engine pod 142, and other wing systems (e.g., leading edge slats, trailing edge flaps, and spoilers) away from the fuselage 110, thus necessitating, at a minimum, lengthening of the fuel, hydraulic, and electrical lines that extend to these systems from the fuselage 110. In addition, shifting the engine pod 142 further outboard can also require a redesign of the rudder of the baseline aircraft (not shown) to compensate for increased yaw forces resulting from an "engine out" design condition.

The chordwise insert 104b shown in FIG. 1B also has a number of shortcomings. For example, the addition of the chordwise insert 104b may require relofting the entire wing to restore the original airfoil shape of the existing wing 102 to the cross-section. In addition, the existing wing 102 must be reworked along the entire span to integrate the chordwise insert 104b with the existing structure.

The wing-tip extension 104c shown in FIG. 1C also has shortcomings. Although this may be the simplest approach to increasing wing area, the wing-tip extension 104c unfavorably shifts the center of pressure on the wing outboard, thereby increasing the bending loads on the existing wing 102. As a result, adding the wing-tip extension 104c can require structurally reinforcing the existing wing 102, especially at the attachment to the fuselage 110. A further shortcoming associated with the wing-tip extension 104c is that structural reinforcement is often required at the tip of the existing wing 102 to carry the loads introduced from the wing-tip extension 104c. Still further, the wing-tip extension 104c typically does not provide a substantial increase in wing area or fuel volume.

SUMMARY

The present invention is directed to derivative aircraft and methods for their manufacture. In one embodiment, a derivative wing is derived from a baseline wing having a first outboard wing portion, a first forward inboard wing portion, and a first aft inboard wing portion. In one aspect of this embodiment, the derivative wing includes a second outboard wing portion sized and shaped at least generally similarly to the first outboard wing portion, a second forward inboard wing portion sized and shaped at least generally similarly to the first forward inboard wing portion, and a second aft inboard wing portion sized and shaped at least generally similarly to the first aft inboard wing portion. In another aspect of this embodiment, the derivative wing further includes a wing insert having a spanwise wing insert portion and a chordwise wing insert portion. In this embodiment, the chordwise wing insert portion is interposed between the second forward inboard wing portion and the second aft inboard wing portion to structurally connect the second forward inboard wing portion to the second aft inboard wing portion. Further, the spanwise wing insert portion is interposed between the second outboard wing portion and the second forward and aft inboard wing portions to structurally connect the second outboard wing portion to the second forward and aft inboard wing portions. Accordingly, in this embodiment, the addition of the wing insert portions provides the derivative wing with a wing area greater than the baseline wing from which it was derived. In other embodiments, wing portions similar to the wing insert portions can be removed from a baseline wing to provide a derivative wing with a wing area less than the baseline wing from which it was derived.

In another embodiment, a method for manufacturing an aircraft wing includes providing an outboard wing portion, a forward inboard wing portion, and an aft inboard wing portion. In one aspect of this embodiment, the aft inboard wing portion is configured to be attached to the forward inboard wing portion, and the outboard wing portion is configured to be attached to the forward and aft inboard wing portions. In another aspect of this embodiment, the method further includes attaching a chordwise wing insert portion to the forward and aft inboard wing portions, and attaching a spanwise wing insert portion to the outboard wing portion and the forward and aft inboard wing portions.

In yet another embodiment, a wing insert is usable with a baseline wing having an outboard wing portion and an inboard wing portion, the inboard wing portion having a forward inboard wing portion and an aft inboard wing portion. In one aspect of this embodiment, the wing insert includes a chordwise wing insert portion and a spanwise wing insert portion adjacent to the chordwise wing insert portion. The chordwise wing insert portion is configured to be interposed between the forward inboard wing portion and the aft inboard wing portion to increase an average chord of the inboard wing portion of the baseline wing. The spanwise wing insert portion is configured to be interposed between the outboard wing portion and the forward and aft inboard wing portions to increase a wingspan of the baseline wing.

DETAILED DESCRIPTION

The following disclosure describes derivative aircraft and derivative aircraft wings. Certain specific details are set forth in the following description and in FIGS. 2–7 to provide a thorough understanding of various embodiments of the invention. Those of ordinary skill in the relevant art will understand, however, that the present invention may have additional embodiments and that the invention may be practiced without several of the details described below. In other instances, well-known structures and systems often associated with aircraft have not been shown or described in detail here to avoid unnecessarily obscuring the description of the various embodiments of the invention.

In the drawings, identical reference numbers identify identical or substantially similar elements. To facilitate the discussion of any particular element, the most significant digit or digits in a reference number refers to the figure number in which that element is first introduced. For example, element 202 is first introduced and discussed in reference to FIG. 2. In addition, dimensions, angles, and other specifications shown in the figures are representative of particular embodiments of the invention. Accordingly, other embodiments of the invention can have other dimensions, angles, and specifications without departing from the spirit or scope of the present invention.

Figure 2:
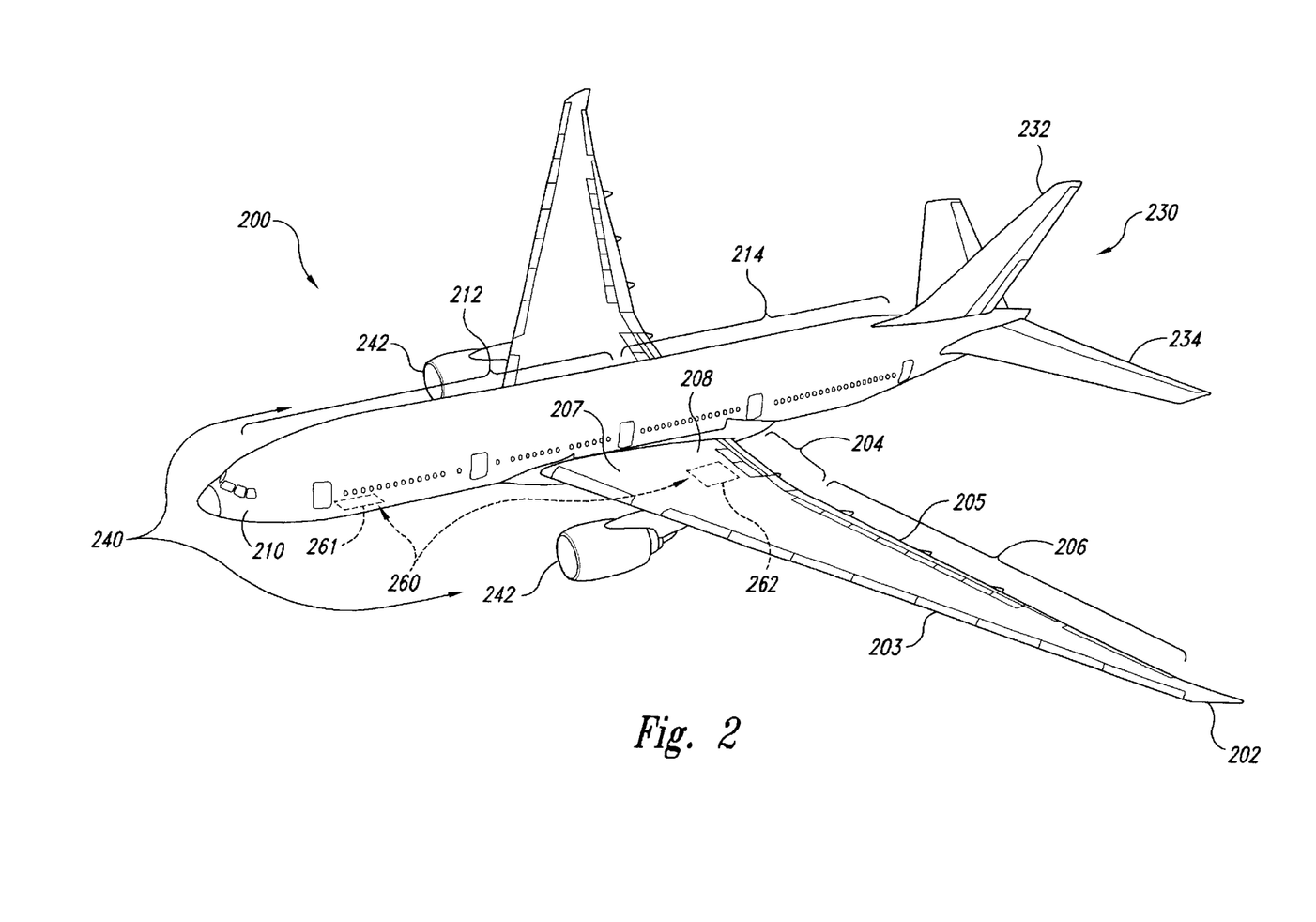
FIG. 2 is a top-front isometric view of a baseline aircraft having a baseline fuselage and a baseline wing in accordance with an embodiment of the invention.

FIG. 2 is a top-front isometric view of a baseline aircraft 200 having a baseline fuselage 210 and a baseline wing 202 in accordance with an embodiment of the invention. In one aspect of this embodiment, the baseline fuselage 210 has a forward fuselage portion 212 and an aft fuselage portion 214 providing a baseline fuselage length. In a further aspect of this embodiment, the baseline wing 202 extends outwardly from the baseline fuselage 210 and has an inboard wing portion 204 and an outboard wing portion 206 providing a baseline wing area. The inboard wing portion 204 of the baseline wing 202 has a forward inboard wing portion 207 toward a leading edge 203 and an aft inboard wing portion 208 toward a trailing edge 205.

Figure 3:
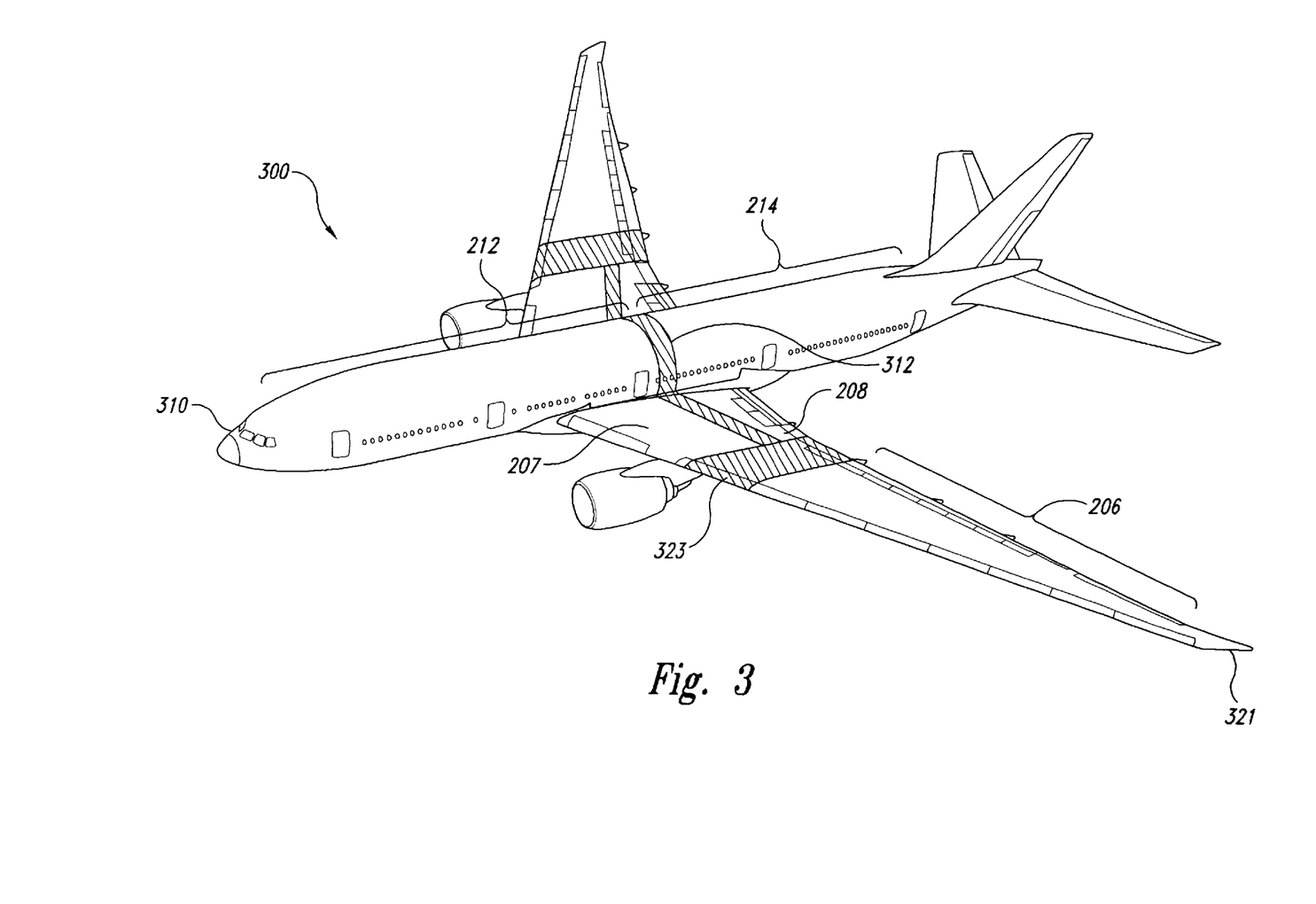
FIG. 3 is a top-front isometric view of a derivative aircraft having a derivative fuselage and a derivative wing in accordance with an embodiment of the invention.

FIG. 3 is a top-front isometric view of a derivative aircraft 300 having a derivative fuselage 310 and a derivative wing 321 in accordance with an embodiment of the invention. In one aspect of this embodiment, the derivative aircraft 300 is derived from the baseline aircraft 200 shown in FIG. 2 and includes many components that are the same or at least substantially similar to components of the baseline aircraft 200. For example, the derivative fuselage 310 includes the forward fuselage portion 212 and the aft fuselage portion 214 of the baseline fuselage 210. Similarly, the derivative wing 321 includes the outboard wing portion 206, the forward inboard wing portion 207, and the aft inboard wing portion 208 of the baseline wing 202.

In one embodiment that will be described in greater detail below, the derivative wing 321 further includes a wing insert 323 interposed between the outboard wing portion 206, the forward inboard wing portion 207, and the aft inboard wing portion 208 to structurally connect these wing portions and provide the derivative wing 321 with a wing area greater than the baseline wing area. In one aspect of this embodiment, the derivative fuselage 310 further includes a fuselage insert 312 interposed between the forward fuselage portion 212 and the aft fuselage portion 214 to structurally connect these fuselage portions and provide the derivative fuselage with a fuselage length greater than the baseline fuselage length. Although, in this embodiment, the derivative wing 321 has a wing area greater than the baseline wing 202 from which it is derived, and the derivative fuselage 310 has a fuselage length greater than the baseline fuselage 210 from which it is derived, in other embodiments, other derivative wings can have wing areas less than the baseline wings from which they are derived, and other derivative fuselages can have fuselage lengths less than the baseline fuselages from which they are derived. As will be discussed in greater detail below, reducing wing areas can include removing wing inserts such as the wing insert 323 and rejoining the remaining wing portions, and reducing fuselage lengths can include removing fuselage inserts such as the fuselage insert 312 and rejoining the remaining fuselage portions.

Returning to FIG. 2, in one embodiment the baseline aircraft 200 further includes an empennage 230 extending from the baseline fuselage 210 proximate to the aft fuselage portion 214. In one aspect of this embodiment, the empennage 230 includes a vertical tail 232 and a horizontal tail 234. The vertical tail 232 can include a fixed portion (i.e., a vertical stabilizer) and a moveable portion (i.e., a rudder) for controlling yaw motion of the baseline aircraft 200.

Similarly, the horizontal tail 234 can include a fixed portion (i.e., a horizontal stabilizer) and a moveable portion (i.e., an elevator) for controlling pitch motion of the baseline aircraft 200. In other embodiments, the baseline aircraft 200 can have other control surfaces for controlling pitch and yaw motions.

In one embodiment, the baseline aircraft 200 further includes a landing gear system 260 and a propulsion system 240. In one aspect of this embodiment, the landing gear system 260 includes a nose gear assembly 261 and a main gear assembly 262, both shown schematically in FIG. 2. The nose gear assembly 261 is integrated with the forward fuselage portion 212 and is shown in a stowed configuration in FIG. 2. The main gear assembly 262 is integrated with the inboard wing portion 204 and is also shown in a stowed configuration in FIG. 2. The landing gear system 260 of the illustrated embodiment represents only one of the many possible landing gear arrangements that can be used in accordance with the present invention. Accordingly, in other embodiments, the baseline aircraft 200 can have other landing gear systems.

In a further aspect of this embodiment, the propulsion system 240 includes an engine pod 242 suspended from the baseline wing 202 at least proximate to the leading edge 203. In other embodiments, the propulsion system 240 can have other engine configurations. For example, in one embodiment the engine pod 242 can be suspended from the baseline wing 202 proximate to the trailing edge 205. In another embodiment that will be explained in greater detail below, the propulsion system 240 can include two engine pods suspended under each wing for a total of four engine pods. In yet other embodiments, the propulsion system 240 can be mounted to the baseline fuselage 210.

Figure 4:
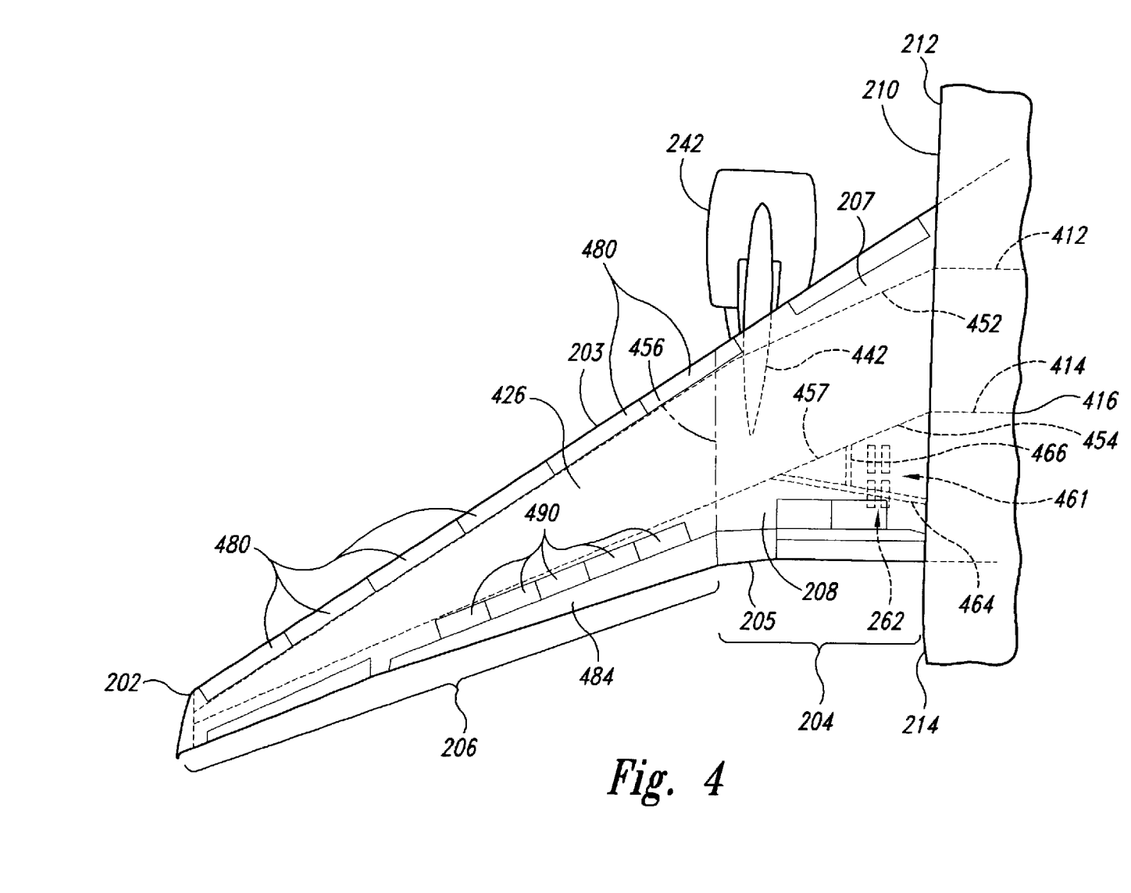
FIG. 4 is a top view of the baseline wing and a portion of the baseline fuselage shown in FIG. 2 in accordance with an embodiment of the invention.

FIG. 4 is a top view of the baseline wing 202 and a portion of the baseline fuselage 210 shown in FIG. 2 in accordance with an embodiment of the invention. In one aspect of this embodiment, the baseline wing 202 includes engine support structure 442 structurally attaching the engine pod 242 to the baseline wing 202. The engine support structure 442 is integrated with the forward inboard wing portion 207 at least proximate to the leading edge 203. In a further aspect of this embodiment, the baseline wing 202 includes landing gear support structure 461 structurally attaching the main gear assembly 262 to the baseline wing 202. The landing gear support structure 461 is integrated with the aft inboard wing portion 208 at least proximate to the trailing edge 205, and it can include a main landing gear beam 464 and a main landing gear trunnion 466. The configuration of the engine support structure 442 and the landing gear support structure 461 shown in FIG. 4 represents only one possible configuration. Accordingly, in other embodiments, the engine support structure 442 and the landing gear support structure 461 can have other configurations.

In another aspect of this embodiment, the baseline wing 202 includes a front spar 452 and a rear spar 454, and the baseline fuselage 210 includes a first fuselage frame 412 and a second fuselage frame 414. The front and rear spars 452 and 454 extend spanwise through the inboard wing portion 204 and the outboard wing portion 206, and the rear spar 454 is positioned forward of the landing gear support structure 461. The first fuselage frame 412 is positioned adjacent to the front spar 452, and a second fuselage frame 414 is similarly positioned adjacent to the rear spar 454. In other embodiments, the baseline wing 202 and the baseline fuselage 210 can have other wing spar and fuselage frame configurations, respectively.

In a further aspect of this embodiment, the baseline wing 202 includes a plurality of leading edge slats 480 proximate to the leading edge 203, an outboard flap 484 proximate to the trailing edge 205, and a plurality of spoilers 490 positioned on an upper wing surface 426 forward of the outboard flap 484. The leading edge slats 480 and the outboard flap 484 are moveable to enhance low-speed flight characteristics of the baseline aircraft 200. The spoilers 490 are pivotable upwardly relative to the upper wing surface 426 to slow the airspeed of the baseline aircraft 200. In other embodiments, the baseline wing 202 can have other control surfaces in other configurations.

In one embodiment, deriving the derivative aircraft 300 (FIG. 3) from the baseline aircraft 200 (FIG. 2) includes defining a chordwise separation line 456, a spanwise separation line 457, and a fuselage separation line 416. The chordwise separation line 456 extends from the leading edge 203 to the trailing edge 205 and separates the outboard wing portion 206 from the inboard wing portion 204. The spanwise separation line 457 extends from the baseline fuselage 210 to the chordwise separation line 456 and separates the forward inboard wing portion 207 from the aft inboard wing portion 208. The fuselage separation line 416 extends across the width of the baseline fuselage 210, and separates the forward fuselage portion 212 from the aft fuselage portion 214.

In one aspect of this embodiment, the chordwise separation line 456 is positioned outboard of the engine support structure 442. Accordingly, the engine support structure 442 may require little or no redesign when deriving the derivative wing 321 (FIG. 3) from the baseline wing 202. In another aspect of this embodiment, the spanwise separation line 457 is positioned between the engine support structure 442 and the landing gear support structure 461. For example, in one embodiment, the spanwise separation line 457 is positioned proximate to the rear spar 454. Accordingly, the landing gear support structure 461 may require little or no redesign when deriving the derivative wing 321 (FIG. 3) from the baseline wing 202. In yet another aspect of this embodiment, the fuselage separation line 416 is positioned to coincide with the spanwise separation line 457. For example, in one embodiment, the fuselage separation line 416 is positioned proximate to the second fuselage frame 414. In other embodiments, the chordwise separation line 456, the spanwise separation line 457, and the fuselage separation line 416 can have other positions.

Figure 5:
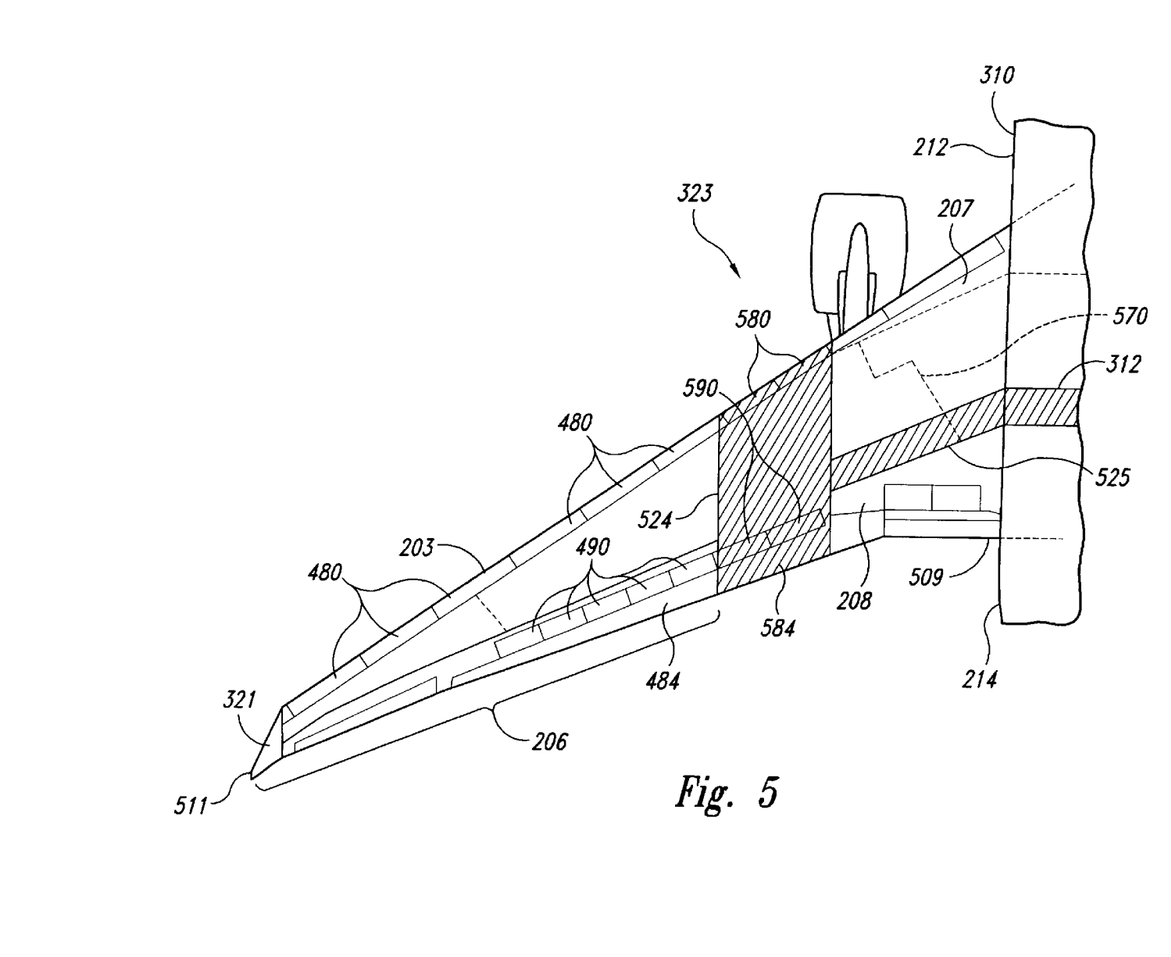
FIG. 5 is a top view of the derivative wing and a portion of the derivative fuselage shown in FIG. 3 in accordance with an embodiment of the invention.

FIG. 5 is a top view of the derivative wing 321 and a portion of the derivative fuselage 310 in accordance with an embodiment of the invention. In one aspect of this embodiment, the outboard wing portion 206 is offset from the forward and aft inboard wing portions 207 and 208 along the chordwise separation line 456 (FIG. 4), and the forward inboard wing portion 207 is offset from the aft inboard wing portion 208 along the spanwise separation line 457 (FIG. 4). In one embodiment, the wing insert 323 includes a spanwise wing insert portion 524 (so named because it increases wingspan), and a chordwise wing insert portion 525 (so named because it increases wing chord). The chordwise wing insert portion 525 is structurally interposed between the forward inboard wing portion 207 and the aft inboard wing portion 208, and the spanwise wing insert portion 524 is structurally interposed between the outboard wing portion 206 and the forward and aft inboard wing portions 207 and 208. Accordingly, the wing insert 323 can add significant wing area to the baseline wing 202 (FIG. 4). In one embodiment, the spanwise and chordwise wing insert portions 524 and 525 can be integral portions of the wing insert 323. In another embodiment, the spanwise and chordwise wing insert portions 524 and 525 can be separate wing insert portions.

In a further aspect of this embodiment, the forward fuselage portion 212 is offset from the aft fuselage portion 214 along the fuselage separation line 416 (FIG. 4), and the fuselage insert 312 is structurally interposed between the forward fuselage portion 212 and the aft fuselage portion 214. In one embodiment, the fuselage insert 312 is at least generally aligned with the chordwise wing insert portion 525. In other embodiments, the wing insert 323 and the fuselage insert 312 can have other configurations.

In one embodiment, the derivative wing 321 includes a fuel volume 570 having an increased fuel capacity adjacent to the spanwise wing insert portion 524 of the wing insert 323. In another embodiment, the derivative wing 321 includes additional leading edge slats 580 adjacent to the spanwise wing insert portion 524 of the wing insert 323 proximate to the leading edge 203. In one aspect of this embodiment, the additional leading edge slats 580 can be substantially similar in structure and function to the leading edge slats 480 of the baseline wing 202. In yet another embodiment, the derivative wing 321 includes a flap extension portion 584 that extends the outboard flap 484 of the baseline wing 202 inboard adjacent to the spanwise wing insert portion 524 proximate to the trailing edge 205. In still another embodiment, the derivative wing 321 further includes additional spoilers 590 that can be substantially similar in structure and function to the spoilers 490 of the baseline wing 202. The additional spoilers 590 extend the row of spoilers 480 of the baseline wing 202 inboard adjacent to the spanwise wing insert portion 524 forward of the flap extension portion 584.

In one embodiment, the derivative wing 321 has a generally uniformly tapering airfoil cross-section extending between a wing-root 509 and a wing-tip 511. In one aspect of this embodiment, the forward inboard wing portion 207 and the aft inboard wing portion 208 can be relofted to blend with the chordwise wing insert portion 525 and the spanwise wing insert portion 524 to achieve this uniformly tapering airfoil cross-section. The term "relofting," as used here, means modifying a cross-section to achieve a selected profile. In other embodiments, the forward inboard wing portion 207 and the aft inboard wing portion 208 are not relofted when used in conjunction with the wing insert 323. Whether or not the forward inboard wing portion 207 and the aft inboard wing portion 208 are relofted, the outboard wing portion 206 need not be relofted to blend with the wing insert 323.

The foregoing discussion of the derivative wing 321 in reference to FIG. 5 describes only some of the modifications that may be made to various portions of the baseline wing 202 (FIG. 4) to define the derivative wing 321. In other embodiments, other modifications can be made or, conversely, some of the modifications described above can be omitted. Furthermore, in other embodiments, other baseline wing configurations may necessitate modifications other than those described above.

Embodiments of the wing insert 323 and the fuselage insert 312 discussed above in reference to FIGS. 2–5 can be employed in a number of different manufacturing scenarios. In one embodiment, the wing insert 323 and the fuselage insert 312 can be retrofit to an existing aircraft to increase the wing area and the fuselage length of the aircraft. In another embodiment, the wing insert 323 can be used at the initial manufacturing stage to produce wings with increased area for use with a "standard" or unmodified fuselage. In yet another embodiment, the wing insert 323 and the fuselage insert 312 can be used at the initial manufacturing stage to produce a new aircraft having increased wing area and increased fuselage length.

Although the discussion above with reference to FIGS. 2–5 describes derivative aircraft having wing areas greater than the baseline aircraft from which they are derived, in other embodiments the derivative aircraft can have wing areas less than the baseline aircraft from which they are derived. In these other embodiments, a derivative wing having a reduced wing area is created by essentially reversing the process outlined above with reference to FIGS. 4 and 5. For example, in one embodiment a derivative wing having a reduced wing area can be derived from a baseline wing by removing a wing insert from the baseline wing generally similar to the wing insert 323 shown in FIG. 5. Similarly, a derivative fuselage having a reduced fuselage length can be derived from a baseline fuselage by removing a fuselage insert generally similar to the fuselage insert 312 shown in FIG. 5. After removing these wing and fuselage inserts, the remaining portions of the derivative wing and the derivative fuselage are then structurally reconnected to complete the derivative aircraft.

Figure 6A:
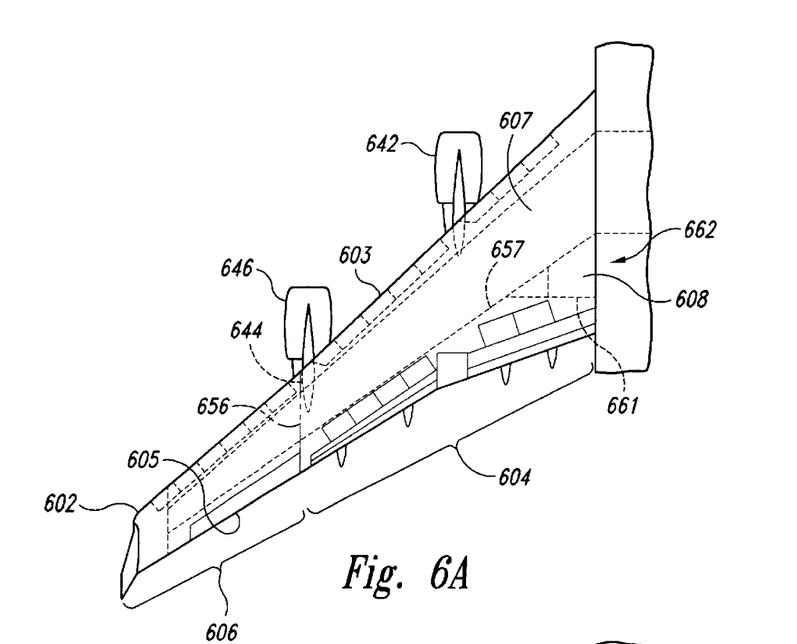
FIGS. 6A and 6B are top views of a baseline wing and a derivative wing, respectively, in accordance with an embodiment of the invention.
Figure 6B:
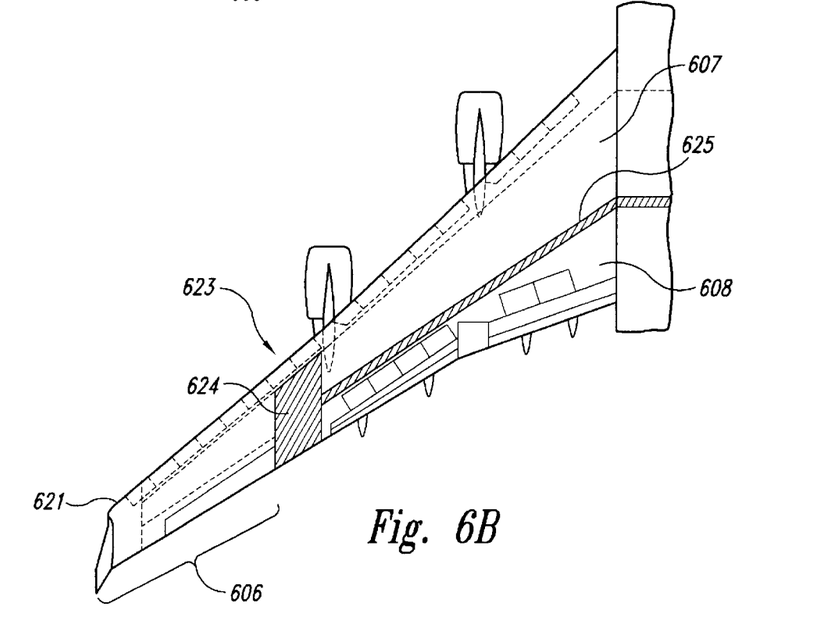

FIG. 6A is a top view of a baseline wing 602, and FIG. 6B is a top view of a derivative wing 621 derived from the baseline wing 602, in accordance with another embodiment of the invention. Referring to FIG. 6A, in one aspect of this embodiment, the baseline wing 602 includes an outboard wing portion 606 and an inboard wing portion 604. The inboard wing portion 604 includes a forward inboard wing portion 607 toward a leading edge 603, and an aft inboard wing portion 608 toward a trailing edge 605. In another aspect of this embodiment, the baseline wing 602 includes an inboard engine pod 642 and an outboard engine pod 646. Both the inboard engine pod 642 and the outboard engine pod 646 are suspended from the baseline wing 602 at least proximate to the leading edge 603. An engine support structure 644 structurally attaches the outboard engine pod 646 to the baseline wing 602 and is integrated with the forward inboard wing portion 607. In a further aspect of this embodiment, the baseline wing 602 includes landing gear support structure 661 structurally attaching a main gear assembly 662 (shown schematically in FIG. 6A) to the baseline wing 602. The landing gear support structure 661 is integrated with the aft inboard wing portion 608 proximate to the trailing edge 605.

In one embodiment, deriving the derivative wing 621 (FIG. 6B) from the baseline wing 602 includes defining a chordwise separation line 656 separating the outboard wing portion 606 from the inboard wing portion 604, and a spanwise separation line 657 intersecting the chordwise separation line 656 and separating the forward inboard wing portion 607 from the aft inboard wing portion 608. In one aspect of this embodiment, the chordwise separation line 656 is positioned outboard of the engine support structure 644, and the spanwise separation line 657 is positioned between the engine support structure 644 and the landing gear support structure 661. In other embodiments, the chordwise separation line 656 and the spanwise separation line 657 can have other positions. Accordingly, the engine and landing gear support structures 644 and 661, respectively, can undergo little or no redesign when deriving the derivative wing 621 from the baseline wing 602.

Referring now to FIG. 6B the derivative wing 621 can include the outboard wing portion 606, the forward inboard wing portion 607, the aft inboard wing portion 608, and a wing insert 623. The outboard wing portion 606 is offset from the forward and aft inboard wing portions 607 and 608 along the chordwise separation line 656 (FIG. 6A), and the forward inboard wing portion 607 is offset from the aft inboard wing portion 608 along the spanwise separation line 651 (FIG. 6A). The wing insert 623 includes a chordwise wing insert portion 625 and a spanwise wing insert portion 624. The chordwise wing insert portion 625 is structurally interposed between the forward inboard wing portion 607 and the aft inboard wing portion 608, and the spanwise wing insert portion 624 is structurally interposed between the outboard wing portion 606 and the forward and aft inboard wing portions 607 and 608. Accordingly, the wing insert 623 can significantly increase the wing area of the baseline wing 602.

Figure 7:
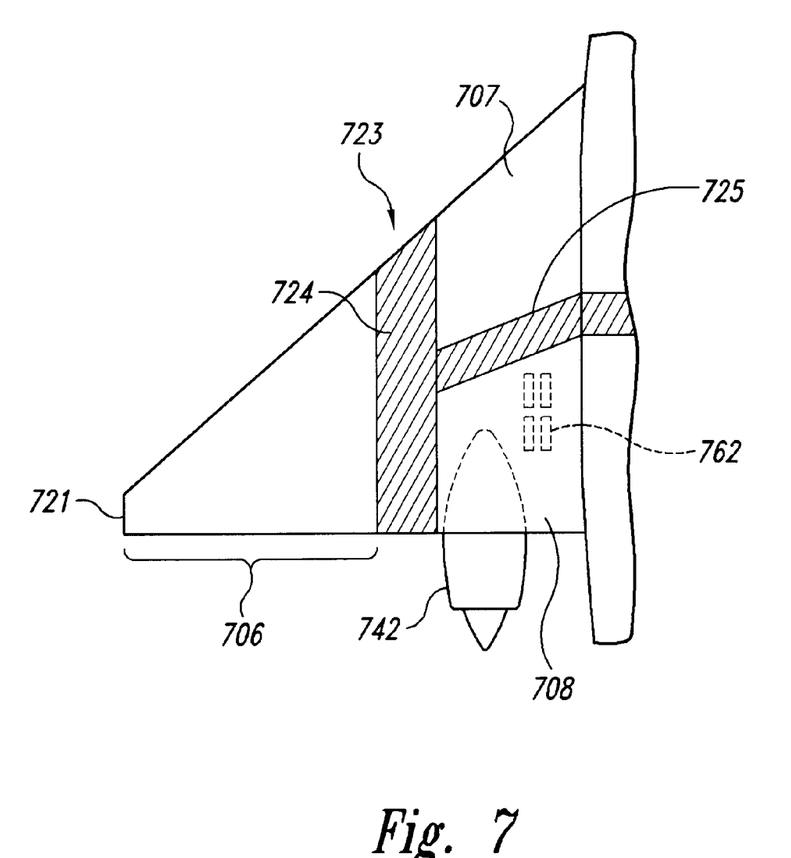
FIG. 7 is a top view of a derivative wing derived from a delta-shaped baseline wing in accordance with an embodiment of the invention.

FIG. 7 is a top view of a derivative wing 721 derived from a delta-shaped baseline wing (not shown) in accordance with an embodiment of the invention. In one aspect of this embodiment, the derivative wing 721 includes a number of components from the delta-shaped baseline wing from which it was derived, such as an outboard wing portion 706, a forward inboard wing portion 707, and an aft inboard wing portion 708. In the illustrated embodiment, the aft inboard wing portion 708 includes an engine nacelle 742 and a main landing gear assembly 762. In a further aspect of this embodiment, the derivative wing 721 includes a wing insert 723 having a spanwise wing insert portion 724 and a chordwise wing insert portion 725. The spanwise wing insert portion 724 structurally connects the outboard wing portion 706 to the forward and aft inboard wing portions 707 and 708 outboard of the engine nacelle 742. Similarly, the chordwise wing insert portion 725 structurally connects the forward inboard wing portion 707 to the aft inboard wing portion 708 forward of the engine nacelle 742 and the landing gear assembly 762. Accordingly, the wing insert 723 can significantly increase the wing area of the delta-shaped wing from which it was derived.

There are a number of advantages associated with embodiments of the derivative aircraft described above with reference to FIGS. 2–7. One advantage is the relative ease with which they can be designed and manufactured. This advantage is a direct result of the wing and fuselage insert configurations that increase commonality between the baseline aircraft and the derivative aircraft, enabling the derivative aircraft to utilize many of the components of the baseline aircraft and leverage the design, manufacture, and certification of the baseline aircraft. Although some modification to the flight systems of the baseline aircraft may be required (e.g., lengthening of hydraulic, fuel, and electrical systems), the modification will not entail major structural rework to the airframe of the baseline aircraft. For example, in one embodiment, the wing insert (e.g., wing insert 323 shown in FIG. 5) requires little or no structural modification to the engine support structure, the main landing gear support structure, and the outboard portion of the wing.

Yet another advantage associated with embodiments of the derivative aircraft described above is that they do not require redesign of the yaw control surfaces of the baseline aircraft. This advantage can be understood with reference to FIGS. 2 and 3 above. Referring to FIG. 3, because the spanwise wing insert portion is outboard of the propulsion system 240, and hence does not move the engine pod 242 outboard relative to the fuselage 310, there will be no increase in yaw moment on the derivative aircraft 300 as compared to the baseline aircraft 200 (FIG. 2) in a "one engine out" design condition. As a result, the vertical tail 232 of the baseline aircraft 200 does not have to be reconfigured when developing the derivative aircraft 300 from the baseline aircraft 200. Thus, the empennage 230 of the baseline aircraft 200 can remain at least generally, if not entirely, the same as that of the derivative aircraft 300.

Still another advantage is the relatively small amount of relofting necessitated by the wing inserts. For example, in one embodiment, adding the wing insert does not require that the outboard wing portion be relofted, and requires only minimal relofting for the inboard wing portions.

Yet another advantage associated with embodiments of the derivative wings is that the wing insert increases the wing cross-section at the wing-root, thereby adding significant load carrying capability to the upper and lower wing skins at the wing-root to further enhance the structural capability of the derivative wing. Such enhanced structural capability is desirable given the fact that the loads experienced by the derivative wing could be greater than those experienced by the baseline wing by virtue of the increased fuel capacity and increased wing area. The foregoing advantages represent only some of the advantages associated with the derivative aircraft and derivative wings described above. Accordingly, wing inserts in accordance with other embodiments can have other advantages.

From the foregoing, it will be appreciated that specific embodiments of the invention have been described herein for purposes of illustration, but that various modifications may be made without deviating from the spirit and scope of the invention. Accordingly, the invention is not limited, except as by the appended claims.

I claim:

1. A method for manufacturing an aircraft wing, the method comprising:
   providing a forward inboard wing portion;
   providing an aft inboard wing portion, wherein the aft inboard wing portion is configured to be attached to the forward inboard wing portion;
   providing an outboard wing portion, wherein the outboard wing portion is configured to be attached to the forward and aft inboard wing portions;
   attaching a chordwise wing insert portion to the forward and aft inboard wing portions; and
   attaching a spanwise wing insert portion to the outboard wing portion and the forward and aft inboard wing portions.

2. The method of claim 1 wherein providing the forward inboard wing portion includes integrating an engine support structure with the forward inboard wing portion.

3. The method of claim 1 wherein providing the aft inboard wing portion includes integrating a landing gear support structure with the aft inboard wing portion.

4. The method of claim 1 wherein providing the outboard wing portion includes omitting engine and landing gear support structures from the outboard wing portion.

5. The method of claim 1 wherein the aircraft wing is a second wing derived from a first wing, the first wing having the outboard wing portion and an inboard wing portion, the method further comprising:
   defining, relative to the first wing, a chordwise separation line separating the outboard wing portion from the inboard wing portion; and
   defining, relative to the first wing, a spanwise separation line separating the inboard wing portion into the forward inboard wing portion and the aft inboard wing portion.

6. The method of claim 5 wherein the first wing includes a leading edge, a trailing edge, and a wing-root, wherein defining the chordwise separation line includes extending the chordwise separation line from the leading edge to the trailing edge, and wherein defining the spanwise separation line includes extending the spanwise separation line from the wing-root to an intersection with the chordwise separation line.

7. The method of claim 5 wherein the first wing includes an engine support structure, and wherein defining the chordwise separation line includes positioning the chordwise separation line at least generally outboard of the engine support structure.

8. The method of claim 5 wherein the first wing includes a landing gear support structure, and wherein defining the spanwise separation line includes positioning the spanwise separation line at least generally forward of the landing gear support structure.

9. The method of claim 5 wherein the first wing includes an engine support structure and a landing gear support structure, wherein defining the chordwise separation line includes positioning the chordwise separation line at least generally outboard of the engine support structure, and wherein defining the spanwise separation line includes positioning the spanwise separation line at between the landing gear support structure and the engine support structure.

10. The method of claim 5 wherein the first wing includes a leading edge, a trailing edge, an engine support structure positioned toward the leading edge, and a landing gear support structure positioned toward the trailing edge, wherein defining the chordwise separation line includes positioning the chordwise separation line at least generally outboard of the engine support structure, and wherein defining the spanwise separation line includes positioning the spanwise separation line at least generally between the landing gear support structure and the engine support structure.

11. The method of claim 5 wherein the first wing includes a wing spar, and wherein defining the spanwise separation line includes positioning the spanwise separation line adjacent to the wing spar.

12. The method of claim 5 wherein the first wing includes a forward wing spar and an aft wing spar, and wherein defining the spanwise separation line includes positioning the spanwise separation line adjacent to the aft wing spar.

13. The method of claim 5 further comprising:
  positioning the outboard wing portion relative to the inboard wing portion to define a spanwise space between the outboard wing portion and the inboard wing portion;
  positioning the forward inboard wing portion relative to the aft inboard wing portion to define a chordwise space between the forward inboard wing portion and the aft inboard wing portion;
  interposing the chordwise wing insert portion between the forward and aft inboard wing portions in the chordwise space; and
  interposing the spanwise wing insert portion between the outboard wing portion and the forward and aft inboard wing portions in the spanwise space.

14. The method of claim 13 further comprising:
  relofting the forward inboard wing portion of the first wing; and
  relofting the aft inboard wing portion of the first wing, wherein interposing the chordwise wing insert portion between the forward and aft inboard wing portions includes blending the forward inboard wing portion, the chordwise wing insert portion, and the aft inboard wing portion to provide a uniform airfoil section.

15. A method for manufacturing an aircraft, the method comprising:
  providing a forward inboard wing portion;
  providing an aft inboard wing portion, wherein the aft inboard wing portion is configured to be attached to the forward inboard wing portion;
  providing an outboard wing portion, wherein the outboard wing portion is configured to be attached to the forward and aft inboard wing portions;
  attaching a chordwise wing insert portion to the forward and aft inboard wing portions;
  attaching a spanwise wing insert portion to the outboard wing portion and the forward and aft inboard wing portions;
  providing a fuselage; and
  attaching the forward inboard wing portion, the aft inboard wing portion, and the chordwise wing insert portion to the fuselage.

16. The method of claim 15 wherein providing the forward inboard wing portion includes integrating an engine support structure with the forward inboard wing portion, and wherein providing the aft inboard wing portion includes integrating a landing gear support structure with the aft inboard wing portion.

17. The method of claim 15 wherein the aircraft is a second aircraft derived from a first aircraft, wherein the first aircraft includes a wing having the outboard wing portion and an inboard wing portion, the method further comprising:
  defining, relative to the wing, a chordwise separation line separating the outboard wing portion from the inboard wing portion; and
  defining, relative to the wing, a spanwise separation line separating the inboard wing portion into the forward inboard wing portion and the aft inboard wing portion.

18. The method of claim 17 wherein the wing includes a leading edge, a trailing edge, and a wing-root, wherein defining the chordwise separation line includes extending the chordwise separation line from the leading edge to the trailing edge, and wherein defining the spanwise separation line includes extending the spanwise separation line from the wing-root to an intersection with the chordwise separation line.

19. The method of claim 17 wherein the wing includes an engine support structure and a landing gear support structure, wherein defining the chordwise separation line includes positioning the chordwise separation line at least generally outboard of the engine support structure, and wherein defining the spanwise separation line includes positioning the spanwise separation line between the landing gear support structure and the engine support structure.

20. The method of claim 17 further comprising:
  positioning the outboard wing portion relative to the inboard wing portion to define a spanwise space between the outboard wing portion and the inboard wing portion;
  positioning the forward inboard wing portion relative to the aft inboard wing portion to define a chordwise space between the forward inboard wing portion and the aft inboard wing portion;
  interposing the chordwise wing insert portion between the forward and aft inboard wing portions in the chordwise space; and
  interposing the spanwise wing insert portion between the outboard wing portion and the forward and aft inboard wing portions in the spanwise space.

21. The method of claim 15 wherein providing the fuselage includes providing a forward fuselage portion and an aft fuselage portion, wherein the forward fuselage portion is configured to be attached to the aft fuselage portion, wherein the method further comprises attaching a fuselage insert to the forward fuselage portion and the aft fuselage portion.

22. The method of claim 15 wherein the fuselage is a second fuselage derived from a first fuselage, the first fuselage having a forward fuselage portion and an aft fuselage portion, and wherein providing the second fuselage includes:
  defining, relative to the first fuselage, a fuselage separation line separating the forward fuselage portion from the aft fuselage portion;

positioning the forward fuselage portion relative to the aft fuselage portion to define a space between the forward fuselage portion and the aft fuselage portion;

interposing a fuselage insert in the space between the forward fuselage portion and the aft fuselage portion; and attaching the forward and aft fuselage portions to the fuselage insert.

23. The method of claim 22 wherein the aircraft is a second aircraft derived from a first aircraft, wherein the first aircraft includes a wing having the outboard wing portion and an inboard wing portion, the method further comprising:

defining, relative to the wing, a chordwise separation line separating the outboard wing portion from the inboard wing portion; and defining, relative to the wing, a spanwise separation line separating the inboard wing portion into the forward inboard wing portion and the aft inboard wing portion, wherein defining the fuselage separation line includes positioning the fuselage separation line adjacent to the spanwise separation line.

24. The method of claim 23 wherein the wing includes a wing spar and the first fuselage includes a fuselage frame adjacent to the wing spar, wherein defining the spanwise separation line includes positioning the spanwise separation line adjacent to the wing spar, and wherein defining the fuselage separation line includes positioning the fuselage separation line adjacent to the fuselage frame.

25. The method of claim 23 wherein the wing includes a forward wing spar and an aft wing spar and the first fuselage includes a fuselage frame adjacent to the aft wing spar, wherein defining the spanwise separation line includes positioning the spanwise separation line adjacent to the aft wing spar, and wherein defining the fuselage separation line includes positioning the fuselage separation line adjacent to the fuselage frame.

26. A method for deriving a second aircraft from a first aircraft, the first aircraft having a first wing, the first wing having a first outboard wing portion, a first forward inboard wing portion, and a first aft inboard wing portion, the method comprising:

providing a chordwise wing insert portion;

attaching the chordwise wing insert portion to a second forward inboard wing portion and a second aft inboard wing portion, the second forward inboard wing portion being sized and shaped at least generally similarly to the first forward inboard wing portion, and the second aft inboard wing portion being sized and shaped at least generally similarly to the first aft inboard wing portion;

providing a spanwise wing insert portion; and attaching the spanwise wing insert portion to a second outboard wing portion and the second forward and aft inboard wing portions, the second outboard wing portion being sized and shaped at least generally similarly to the first outboard wing portion.

27. The method of claim 26 wherein the first aircraft includes a first fuselage having a first forward fuselage portion and a first aft fuselage portion, and wherein the method further comprises:

providing a fuselage insert; and attaching the fuselage insert to a second forward fuselage portion and a second aft fuselage portion, the second forward fuselage portion being at least generally the same as the first forward fuselage portion, and the second aft fuselage portion being at least generally the same as the first aft fuselage portion.

28. The method of claim 27 further comprising:

attaching the second forward inboard wing portion to the second forward fuselage portion;

attaching the second aft inboard wing portion to the second aft fuselage portion; and attaching the chordwise wing insert portion to the fuselage insert.

29. A method for deriving a second wing from a first wing, the first wing having a leading edge, a trailing edge, a wing-root extending between the leading edge and the trailing edge, and a first wing area, the method comprising:

removing a spanwise wing portion from the first wing, the spanwise wing portion extending from the leading edge to the trailing edge to define an outboard wing portion and an inboard wing portion, the inboard wing portion including the wing-root;

removing a chordwise wing portion from the first wing, the chordwise wing portion extending outwardly from the wing-root between the leading edge and the trailing edge to define a forward inboard wing portion and an aft inboard wing portion;

connecting the forward inboard wing portion to the aft inboard wing portion; and connecting the outboard wing portion to the forward and aft inboard wing portions to provide the second wing with a second wing area less than the first wing area.

30. The method of claim 29 wherein the first wing includes an engine support structure, and wherein removing the spanwise wing portion includes locating the spanwise wing portion at least generally outboard of the engine support structure.

31. The method of claim 29 wherein the first wing includes a landing gear support structure, and wherein removing the chordwise wing portion includes locating the chordwise wing portion at least generally forward of the landing gear support structure.

32. The method of claim 29 wherein the first wing includes an engine support structure and a landing gear support structure, wherein removing the spanwise wing portion includes locating the spanwise wing portion at least generally outboard of the engine support structure, and wherein removing the chordwise wing portion includes locating the chordwise wing portion between the landing gear support structure and the engine support structure.

33. The method of claim 29 wherein the first wing includes an engine support structure positioned toward the leading edge and a landing gear support structure positioned toward the trailing edge, wherein removing the spanwise wing portion includes locating the spanwise wing portion at least generally outboard of the engine support structure, and wherein removing the chordwise wing portion includes locating the chordwise wing portion between the landing gear support structure and the engine support structure.

34. The method of claim 29 wherein the first wing includes a wing spar, and wherein removing the chordwise wing portion includes locating the chordwise wing portion adjacent to the wing spar.

35. The method of claim 29 wherein the first wing extends outwardly from a fuselage, and wherein the method further comprises:

removing a fuselage insert from the fuselage, the fuselage insert defining a forward fuselage portion and an aft fuselage portion; and connecting the forward fuselage portion to the aft fuselage portion.

* * * * *